United States Patent [19]

Lin et al.

[11] Patent Number: 4,791,230

[45] Date of Patent: Dec. 13, 1988

[54] HYDROXY-TERMINATED AMIDES

[75] Inventors: Jiang-Jen Lin, Round Rock; George P. Speranza, Austin, both of Tex.

[73] Assignee: Texaco Chemical Company, White Plains, N.Y.

[21] Appl. No.: 174,580

[22] Filed: Mar. 30, 1988

[51] Int. Cl.$^4$ .............................................. C07C 102/00
[52] U.S. Cl. .................................... 564/159; 521/164; 521/167; 528/272
[58] Field of Search .......................................... 564/159

[56] References Cited

U.S. PATENT DOCUMENTS

| | | | |
|---|---|---|---|
| 3,436,463 | 4/1969 | Mayhew | 564/159 |
| 3,803,091 | 4/1974 | Murfin | 564/159 |
| 3,923,494 | 12/1975 | Teach | 564/159 |
| 4,228,102 | 10/1980 | Besecke | 564/159 |
| 4,393,237 | 7/1983 | Yeakey et al. | 564/159 |
| 4,490,557 | 12/1984 | Dawson et al. | 564/159 |
| 4,556,497 | 12/1985 | Horodysky | 564/159 |
| 4,600,796 | 7/1986 | Goel | 564/159 |

*Primary Examiner*—Morton Foelak
*Attorney, Agent, or Firm*—Jack H. Park; Kenneth R. Priem; Richard A. Morgan

[57] ABSTRACT

A series of hydroxy-terminated amides has been discovered. They are of the formulae:

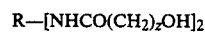

and

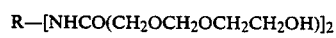

wherein:

R is a polyoxyethylene radical of 1 to 9 mers which is optionally capped at both ends with 1 or 2 propylene oxide mers, and z is 3 or 5.

The amides are water soluble and cold acetone insoluble. They are useful in flexible polyurethane foams.

10 Claims, No Drawings

HYDROXY-TERMINATED AMIDES

CROSS-REFERENCE TO RELATED APPLICATION

That invention is related to U.S. Pat. No. 4,735,746 issued Apr. 5, 1988 for a long lasting detergent bar containing a polyamide or polyester polymer which is a continuation-in-part of application Ser. No. 874,726 filed June 16, 1986, now abandoned.

BACKGROUND OF THE INVENTION

1. Field of the Invention

This invention relates to a series of hydroxy-terminated amides. These compounds are useful in synthesizing polyesters and polyamide-polyesters for use in polyurethane elastomers and flexible foams.

2. Description of the Useful Arts

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a molecular weight of about 2,000 to 3,000 and above. These polyols are then reacted with polyisocyanate in the presence of water or other blowing agents such as fluorocarbons to obtain polyurethane foams.

U.S. Pat. No. 4,568,717 to G. P. Speranza et al describes polymer polyols made by reacting a liquid terephthalic polyester polyol with an organic polyisocyanate in the presence of a polyether polyol solvent.

U.S. Pat. No. 9,609,685 to M. Cuscurida et al describes modified amino polyols for use in preparing flexible polyurethane foams.

SUMMARY OF THE INVENTION

The invention is a series of hydroxy-terminated amides. These amides are represented by the formulae:

and

wherein:
R is a polyoxyalkylene moiety selected from the group consisting of:

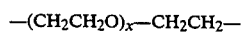

and

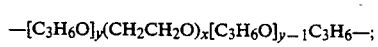

x ranges from 1 to 9,
y is 1 or 2, and
z is 3 or 5.

DESCRIPTION OF THE PREFERRED EMBODIMENTS

These amides are produced by reacting a polyoxyethylene diamine, e.g. bis-aminoethyl ether, triethylene glycol diamine or tetraethylene glycol diamine, with gamma-butyrolactone, epsilon-caprolactone or dioxanone at 120° C. to 250° C. Optionally the polyoxyethylene polymer within the diamine may be capped with one or two oxypropylene mers. The products are purified by hot acetone recrystallization. The purified products are all water soluble and cold acetone insoluble.

The hydroxy terminated amides are reacted with dicarboxylic acids, e.g. terephthalic acid or adipic acid, to form polyester polyamide dibasic acids of the formula:

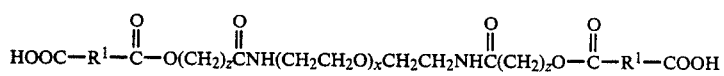

wherein:
$R^1$ is phenyl, alkylphenyl, alkylene or oxyalkylene.

This polyester may then be reacted with diamines of the general formula: $H_2N-R^2-NH_2$ wherein $R^2$ is a polyoxyalkylene moiety, to form diamines of the formula:

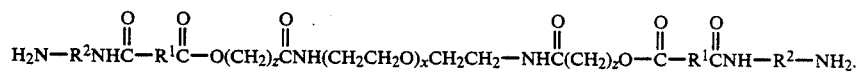

These polyether, polyester, polyamide containing compounds are useful in flexible polyurethane foam. They are also useful as polymer intermediates, for example in polyester polyamide polymer intermediates.

This invention is shown by way of Example.

EXAMPLE 1

A. To a 183-cc glass lined stainless steel autoclave was charged epsilon-caprolactone (11.4 g, 0.1 mole), bis-aminoethylether (10.4 g, 0.1 mole), and water (1.8 g). The system was purged with nitrogen, sealed and heated to 270° C. for four hours with agitation and rocking. Then the reactor was allowed to cool to room temperature. A white solid product (22.8 g) was recovered. The amine assay indicated the presence of 4.0 g meq/g total amine.

A portion (15 g) of crude product was recrystallized with 40 cc hot acetone to give a white powder (5.8 g, ca. 62% yield based on epsilon-caprolactone charged). The H-nmr analysis confirmed the following structure (I):

B. The synthesis was repeated with a caprolactone: bis-aminoethyl ether molar ratio of 2:1. The white powder recovered had a melting range of 86° C. to 90° C. The compound was water, hot acetone and acetonitrile soluble. It was cold acetone and tetrahydrofuran insoluble.

EXAMPLE 2

The amide of Example 1-B synthesized from bis-aminoethyl ether and epsilon-caprolactone was used as a chain extender to produce a flexible urethane foam.

The following ingredients were mixed:

|  | Parts by weight |
| --- | --- |
| 3000 mw polyether polyol | 100 |
| Amide of Example 1-B | 5 |
| Water | 4 |
| Silicone surfactant | 1.0 |
| 33% triethylene diamine in propylene glycol | 0.3 |
| stannous octoate catalyst | 0.5 |
| Then toluene diisocyanate was added and the mixture stirred for five seconds. | |
| Toluene diisocyanate | 52.4 |
| NCO/OH | 1.05 |
| Details | |
| Cream time, sec | 10 |
| Gel time, sec | 100 |
| Result | Good foam |

| GLOSSARY | |
| --- | --- |
| THANOL ® F-3020 | 3000 mw polyether polyol - Texaco Chemical Co. |
| L-711 | SIL-WET 711 silicone surfactant - Union Carbide Corp. |
| THANOL ® TD-33 | 33% triethylene diamine in propylene glycol - Texaco Chemical Co. |
| T-10 | stannous octoate catalyst - M & T Chemicals |

EXAMPLE 3

A 100-ml 3-necked flask equipped with stirring bar and K-distillation head was charged with gamma-butyrolactone (34.4 g, 0.4 mole) and triethylene glycol diamine (29.6 g, 0.2 mole). Nitrogen was pressured into the reaction mixture through a dip tube. The reaction mixture was heated to 180° C. and held for 4 hours. After cooling to room temperature, 62.3 g of a white solid was recovered. The melting range was 47° to 51° C. The amine analysis of 0.37 meq/gram amine indicated the completed reaction (6.25 meq/amine calculated before reaction).

The white solid was water, hot acetone and acetonitrile soluble. In was cold acetone and tetrahydrofuran insoluble.

EXAMPLE 4

A. To a 250-ml 3-necked flask equipped with heating mantle, mechanical stirrer and condenser, was charge gamma-butyrolactone (43 g, 0.5 mole) and bis-aminoethyl ether (52 g, 0.5 mole). The system was heated to 180° C. for 3 hours with nitrogen bubbled through the reaction mixture. After cooling to room temperature, a brown viscous liquid was obtained (82.3 g). Amine analysis indicated 3.4 meq/g total amine. The H-nmr indicated the presence of compound II and bis-aminoethyl ether.

B. The synthesis was repeated with the charge of gamma-butyrolactone: bis-aminoethyl ether in a molar ratio of 2:1. A sticky brown solid was recovered which demonstrated a low melting range. Amine analysis indicated 0.43 meq/gram amine.

The solid was water, hot acetone and acetonitrile soluble. It was cold acetone and tetrahydrofuran insoluble.

EXAMPLE 5

A. The synthesis of Example 3 was repeated with an epsilon-caprolactone: triethylene glycol diamine molar ratio of 2:1. The white solid adduct was recovered which demonstrated a melting range of 71° to 74° C. The white solid was soluble in water, hot acetone and acetonitrile. It was insoluble in cold acetone and tetrahydrofuran.

B. The adduct (15 g, 0.04 mole) was added to a 50 ml 3-neck flask equipped with a stirrer, Dear-Stark trap, thermometer and nitrogen line. The adduct was heated to 180° C. under nitrogen.

Terephthalic acid (9.2 g, 0.08 mole) was added and the temperature raised to 220° C. for about 2 hours. The flask was allowed to cool to room temperature. A hard, brown colored transparent solid was obtained. The solid product softened at about 180° C. The analysis of IR spectrum indicated the polyamide-polyester of the structure:

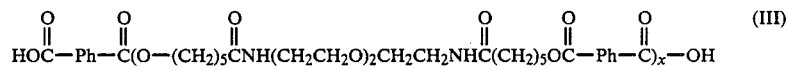

wherein:
Ph was phenyl.

EXAMPLE 6

The synthesis of Example 3 was repeated with a charge a gamma-butyrolactone: tetraethylene glycol diamine in a molar ratio of 2:1. A yellowish liquid was recovered. Amine analysis indicated 0.32 meq/gram amine.

The liquid was soluble in water, hot acetone and acetonitrile. It was insoluble in cold acetone and tetrahydrofuran.

EXAMPLE 7

The synthesis of Example 3 was repeated with a charge of epsilon-caprolactone: tetraethylene glycol diamine in a molar ratio of 2:1. A while solid was recovered which demonstrated a melting range of 56° to 60° C.

The solid was water, hot acetone and acetonitrile soluble. It was insoluble in cold acetone and tetrahydrofuran.

EXAMPLE 8

The synthesis of Example 3 was repeated with a charge of gamma-butyrolactone: diamine in a molar ratio of 2:1. The diamine was JEFFAMINE ®ED-600 of the formula:

$$H_2N-(C_3H_6O)_y(CH_2CH_2O)_x(C_3H_6O)_{y-1}C_3H_6-NH_2$$

wherein:
x averages 8.7 and y averages 1.5 and the molecular weight of the diamine is 600.

A yellowish liquid was recovered. Amine analysis indicated 0.40 meq/gram amine. The liquid was water, hot acetone and acetonitrile soluble. It was insoluble in cold acetone and tetrahydrofuran.

EXAMPLE 9

The synthesis of Example 3 was repeated with charge of epsilon-caprolactone: JEFFAMINE®ED-600 in a molar ratio of 2:1.

A yellowish liquid was recovered which was soluble in water, hot acetone and acetonitrile. It was insoluble in water, hot acetone and tetrahydrofuran.

The physical properties of hydroxy terminated amides of the formula:

$$R-[NHC(O)(CH_2)_zOH]_2$$

are determined by the number of hydrophobic methylene mers (i.e. z), relative to the number of hydrophilic polyoxyethylene mers, (i.e. R). We measured the physical properties of 2:1 molar adducts (gamma butyrolactone or epsilon caprolactone:polyoxyethylene amine), the results of which are summarized in the TABLE.

TABLE

| Physical Properties of 2:1 Adducts | | |
| --- | --- | --- |
| | gamma-butyrolactone z = 3 | epsilon-caprolactone z = 5 |
| bis-aminoethyl ether | solid low melting | white solid mp 86–90° C. |
| diethylene glycol diamine | brown solid mp 47–51° C. | white solid mp 71–74° C. |
| triethylene glycol diamine | yellow liquid — | white solid mp 56–60° C. |
| JEFFAMINE ® ED-600 | yellow liquid — | yellow liquid — |

All of these adducts were soluble in water, hot acetone and acetonitrile. All of these adducts were insoluble in cold acetone and tetrahydrofuran (THF).

While particular embodiments of the invention have been described, it will be understood that the invention is not limited thereto since modifications may be made and it is therefore contemplated to cover by the appended claims any such modifications as fall within the spirit and scope of the claims. For example, mixtures are envisioned.

What is claimed is:

1. A composition of matter of the formula:

$$R'-\overset{O}{\overset{\|}{C}}HN-R-NH\overset{O}{\overset{\|}{C}}-R'$$

wherein:
R is a polyoxyalkylene moiety selected from the group consisting of:

$$-(CH_2CH_2O)_x-CH_2CH_2-$$

and $$-[C_3H_6O]_y(CH_2CH_2O)_x[C_3H_6O]_{y-1}C_3H_6-,$$

x ranges from 1 to 9,
y is 1 or 2; and
R' is a hydroxy moiety selected from the group consisting of:

$$-(CH_2)_3OH,$$

$$-(CH_2)_5OH$$

and $$-CH_2OCH_2CH_2OH.$$

2. A composition of matter of the formula:

$$R-[NHC(O)(CH_2)_zOH]_2$$

wherein:
R is a polyoxyethylene moiety of the formula $$-(CH_2CH_2O)_xCH_2CH_2-$$

x ranges from 1 to 3, and
z is 3 or 5.

3. The composition of matter of claim 2 wherein x is 1 and z is 3.

4. The composition of matter of claim 2 wherein x is 1 and z is 5.

5. The composition of matter of claim 2 wherein x is 2 and z is 3.

6. The composition of matter of claim 2 wherein x is 2 and z is 5.

7. The composition of matter of claim 2 wherein x is 3 and z is 3.

8. The composition of matter of claim 2 wherein x is 3 and z is 5.

9. A composition of matter of the formula:

$$R-[NHC(O)(CH_2)_zOH]_2$$

wherein:
R is a polyoxyalkylene moiety of the formula $$-[C_3H_6O]_y(CH_2CH_2O)_x[C_3H_6O]_{y-1}C_3H_6-$$

x ranges from 1 to 9,
y is 1 or 2, and
z is 3 or 5.

10. The composition of matter of the formula:

$$R-[NHC(O)CH_2OCH_2CH_2OH]_2$$

wherein:
R is a polyoxyalkylene moiety selected from the group consisting of:

$$-(CH_2CH_2O)_x-CH_2CH_2-$$

and $$-[C_3H_6O]_y(CH_2CH_2O)_x[C_3H_6O]_{y-1}C_3H_6-;$$

x ranges from 1 to 9, and
y is 1 or 2.

* * * * *